United States Patent [19]

Moorey et al.

[11] 4,197,585
[45] Apr. 8, 1980

[54] VEHICLE SPEED MEASURING APPARATUS

[76] Inventors: Roger A. Moorey, 25 Carters Way, Wisborough Green, West Sussex; Jeremy D. McKendrick, 43 Clive Ave., West Worthing, Sussex; Felix Schild, 44 Ringwood Ave., London, N.2, all of England

[21] Appl. No.: 882,886

[22] Filed: Mar. 2, 1978

[51] Int. Cl.² ............................................. G01P 3/36
[52] U.S. Cl. ..................................... 364/565; 73/490; 235/92 DN; 324/166; 364/571
[58] Field of Search ............... 364/438, 467, 565, 571; 235/92 DN, 92 TC, 92 FQ, 92 PL, 92 DM; 324/160, 166; 73/488, 490

[56] References Cited
U.S. PATENT DOCUMENTS

| 3,530,382 | 9/1970 | Liston et al. | 364/565 |
| 3,739,270 | 6/1973 | Miller et al. | 324/166 |
| 3,748,580 | 7/1973 | Stevens et al. | 235/92 FQ |
| 3,846,701 | 11/1974 | Sampey | 235/92 DN |
| 4,074,196 | 2/1978 | Webster | 324/166 |

Primary Examiner—Errol A. Krass
Attorney, Agent, or Firm—Brooks, Haidt, Haffner & Delahunty

[57] ABSTRACT

Vehicle speed measuring apparatus employing separate measurement of elapsed time and distance to obtain average vehicle speed in which provision is made for providing signals representative of a calibration factor which can be utilized to correct the distance signals to a number representative of true distance.

10 Claims, 5 Drawing Figures

VEHICLE SPEED MEASURING APPARATUS

This invention relates to electrical speed-measuring apparatus and is especially concerned with apparatus whereby the speed of a vehicle may be measured.

A known apparatus of this kind, described in U.S. Pat. No. 3,530,382, is intended to be mounted in a motor vehicle. The apparatus includes means responsive to rotation of the vehicle wheels to generate a first train of electrical pulse signals of which the number is proportional to a distance travelled by the vehicle. The apparatus also includes means for generating a second train of electrical pulse signals of which the number is proportional to the time of travel of another vehicle over the distance represented by the first pulse train. The apparatus further includes computing means whereby the number of pulses of the first train may be divided by the number of pulses in the second train to devise a measure of the speed of the other vehicle, and means providing a display of the measured speed.

The present invention provides an improved apparatus of the general kind described in the preceding paragraphs wherein certain disadvantages of the known apparatus are reduced or removed.

According to the present invention there is provided vehicle speed measuring apparatus arranged to be mounted on a carrying vehicle and comprising means for generating a first train of pulses of which the number is proportional to distance travelled by the carrying vehicle, a distance counter drivable by said first pulse train and providing distance signals representative of its state of count, manually settable switch means arranged to provide calibration signals representative of a multi-digit calibration factor, arithmetic processing means operable in a first condition of a control means therefor to develop quotient signals denotive of the number obtained when the number represented by said distance signals is divided by said calibration factor, means whereby said distance counter may be set by said quotient signals to a number representative of true distance, means operable to apply said quotient to a numerical display means, and means operable to enter said quotient signals in a distance memory of said processing means, means for generating a second train of pulses of which the number is proportional to elapsed time, a time counter drivable by said second train of pulses and providing time signals representative of its state of count, said processing means being operable in a second condition to multiply the number stored in said distance memory by a fixed constant to obtain a product and in a third condition to divide said product by said time to obtain a speed and means operable to display said speed on said numerical display means.

It is a particular advantage of the apparatus to be described that it includes particularly conveniently operable means whereby a means developing a first train of electrical pulses, of which the number is proportional to distance travelled by the vehicle in which the apparatus is installed, may be adjusted to provide numbers of pulses related to the distance travelled by a predetermined factor of proportionality despite differences or changes in the vehicle which affect this factor.

It is another advantage of the apparatus to be described that it includes a computing means capable of being variably programmed to perform a plurality of desirable operations.

It is an additional advantage of the apparatus to be described that it may include a visual signal indicating to the operator that a predetermined minimum distance has been travelled since the measurement of a distance commenced.

It is a further advantage of the apparatus to be described that it includes means arranged to indicate malfunctions affecting the speed measurement.

It is yet another advantage of the apparatus to be described that it enables a display of distance to be obtained at any time.

Preferred features and advantages of the present invention will become apparent from the following description of an embodiment thereof, given with reference to the drawings, of which:

FIG. 5 is a diagram explanatory of the logic operations associated with the time counter.

Figure 1:
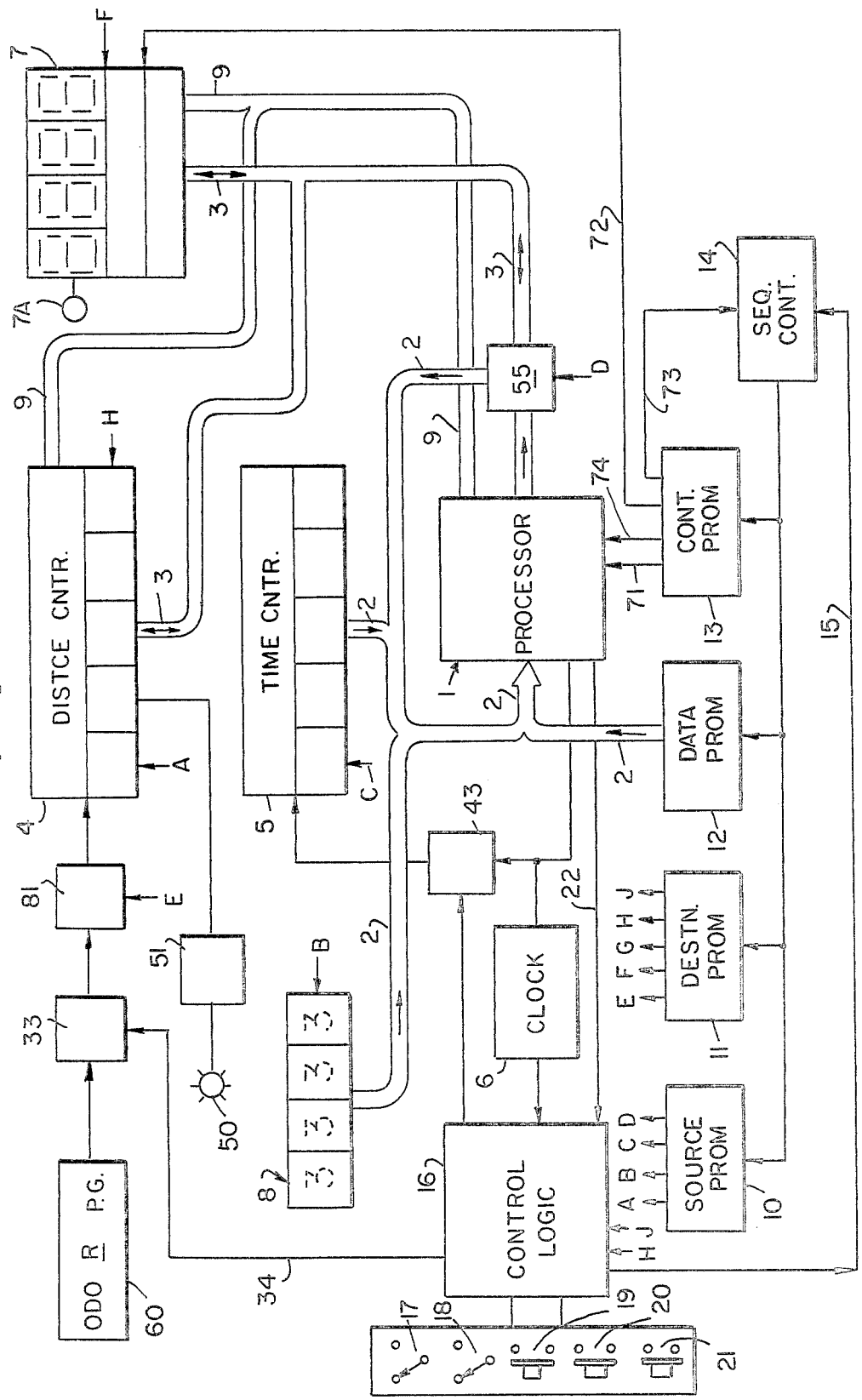
FIG. 1 is a block diagram of a vehicle speed measuring apparatus.

FIG. 1 shows a block diagram of an embodiment of vehicle-borne speed measuring apparatus embodying the invention. In this apparatus, required arithmetic operations are performed by means of a decimal arithmetic processor integrated circuit device 1 of a kind now well known as used in small calculators. Data and commands are fed into processor 1 by way of a unidirectional data bus 2 and data passes in both directions between processor 1 and other units over a bidirectional data bus 3. The functions of the two data buses are described below.

The apparatus includes two five-decade binary-coded decimal counters, a distance counter 4 and a time counter 5. Distance counter 4 performs two functions, in the operating sequence it is used firstly for the counting of distance-denotive pulses developed by a pulse generator driven by the vehicle odometer. Later in the operating sequence, distance counter 4 is used for the storage of computed distances. Counter 4 is thus used both as a measuring device and as a memory device. Distance data may be transferred between processor 1 and distance counter 4 by way of bidirectional data bus 3. Data present on this bus is displayed as required by means of a 4-digit, 7-segment display 7, conveniently using light-emissive diodes (LED's). A manually adjustable control 7A is preferably provided positioned adjacent to the display, by which the value of a stabilized supply voltage for the display may be varied to suit the brightness of the display to the ambient lighting conditions.

Time counter 5 is used to count pulses derived from an accurate clock-pulse generator 6 conveniently a known crystal oscillator. Time data is transferrable from counter 5 to processor 1 by way of unidirectional data bus 2.

Preset digital information may be fed into processor 1 from a bank 8 of four manually settable ten-position calibration switches connected to unidirectional data bus 2. These switches are used to provide signals representative of a calibration factor used in conversion of odometer pulse count to true distance, as later described.

Information is presented on both data buses in the binary coded decimal (BCD) bit-parallel, byte serial mode. In order that data originating in the processor 1 may be decoded in display 7 and in distance counter 4 (when used as a memory) a multi-line timing bus 9 connects processor 1 to counter 4 and to display 7. Of the eleven lines in bus 9, lines 1–5 are used to synchronize data on bidirectional bus 3 with distance counter 1 and display 7, the least-significant digit output from processor 1 being available on bus 3 during the period that a "true" signal appears on timing line 1, the next more-significant digit when a "true" signal is on line 2, and so on. Timing lines 1, 3, 5 and 7 are used to synchronize data being fed over unidirectional bus 2 into processor 1. Timing line 11 is a master synchronizing line, the functions of which are described later.

The signals applied to the timing lines are generated within processor 1 with reference to a master timing signal received from clock 6.

The processor 1 is employed to perform two basic calculations. When provided with a train of pulses from the odometer-driven generator and data provided by the settings of the calibration switches 8 the processor must calculate the true distance travelled. Then, given a true distance stored in the distance counter 4 and a time stored in the time counter 5 the processor must calculate the speed in units per hour (m.p.h. or k.p.h.) represented by this data.

The sequence in which data is presented on the two data buses and the sequence in which the processor is provided with and acts on that data is controlled by four 4-bit read-only memories, 10, 11, 12, 13 most conveniently provided in the form of programmable read-only memories (PROM's). Since they are readily available, it is convenient to employ 256×4-bit PROM's, allowing much spare programme space. A SOURCE PROM 10 defines the required data source and a DESTINATION PROM 11 defines the required data destination. A DATA PROM 12 contains control information (commands) for the processor 1 and numerical constants used in the required computations, such as a conversion factor for converting seconds to hours.

One of the four bits of the output from a CONTROL PROM 13 is passed over a lead 71 to instruct the processor 1 as to the status of the information currently applied to its input. When this bit is a "true" signal the available information is a command (ADD, SUBTRACT) and when this bit is a "false" signal the available information represents numerical data. The second bit of the output from PROM 13 is passed over a lead 72 to define the position of the decimal point in the 4-digit display. The third bit of the output of PROM 13 is applied over a lead 73 to a sequence controller 14 where it is used to define exit points for jump instructions contained in PROMS 10 and 11, for purposes to be described later. The fourth output bit of PROM 13 is passed over a lead 74 to inhibit the operation of processor 1 at certain stages of the operating sequence when it is required that the processor shall remain in a passive state and ignore any data applied to its inputs.

The operating sequence of the apparatus is controlled by the SEQUENCE CONTROLLER 14 which consists essentially of a presettable 8-bit binary counter and eight latches. Changes from each step in the sequence to the next are commanded by signals received over a line 15 from a control logic 16, which also defines and controls any HOLD steps required in programme, such as to display information on the display 7 or to await completion of any required switching operations.

Five manually operable switches are provided to control the operation of the apparatus. These are a TIME toggle switch 17, a DISTANCE toggle switch 18, a TIME RESET push switch 19, a DISTANCE RESET push switch 20, and a DISTANCE RECALL push switch 21. Of these, the TIME toggle switch 17, the DISTANCE toggle switch 18 and the TIME RESET push switch 19 when operated, indicate defined programme runs via the control logic 16. It is arranged that the sequence controller 14 always passes from one programme step to the next in sequence during a period when line 11 of the processor timing bus 9 carries a "true" signal. Since certain processor operations require more than one apparatus cycle for their completion, the processor provides on these occasions, a busy/ready output signal over a line 22 to control logic 19; which signal inhibits the provision of a programme step command over line 15 to sequence control 14 until the processor is ready to accept new data or a further command.

Actuation of the DISTANCE RESET push switch 20 initiates a Master Clear signal which resets all units to a predetermined initial condition. Actuation of the DISTANCE RECALL push switch 21 causes the true distance stored in distance counter 4 to be displayed, when this is required by the operator.

As has been briefly mentioned, the apparatus is arranged to perform two basic programmes, a True Distance calculation and a Speed calculation. The programme is so arranged that it is possible to retain true distance information, once computed, and to perform multiple speed calculations each based on new time information. If an operator error occurs by the performance of an incorrect operation or by the capacity of either of the counters 4 and 5 being exceeded, it is arranged that a display of 000.1 is provided on the display unit 7 to denote a fault condition.

The Programme

The use of Programmable Read Only Memories enables considerable flexibility to be built into the unit. Features may be added or modified simply by writing additional programmes. The following example demonstrates the programme normally used.

| Number in sequence | Operation |
| --- | --- |
| 0 | Set PROMS to provide clear signals to counters 4, 5 and registers in data processor 1. |
| 3 | Halt sequence controller over line 73. Enable distance counter by E from PROM 11 applied to gate 81. When Distance switch 18 is operated, gate 33 is opened by a signal over line 34 and odometer pulses from pulse generator 60 drive distance counter 4. When switch 18 is returned to normal the sequence controller is released and steps to the next condition. |
| 4 | Source PROM 10 applies A to select output of distance counter 4; Source PROM 10 applies D to selector 55 to pass signals from bidirectional bus 3, bus 2 and hence to processor 1. Distance counter information is read into processor 1. |
| 10 | Processor 1 commanded by Control PROM 13 to divide distance by preset calibration factor to make |

-continued

| Number in sequence | Operation |
|---|---|
| 11 | True distance information available in processor. |
| 12 | Check computed true distance against maximum and minimum values in processor memories - if limits are exceeded display Error (000.1). If result within limits transfer true distance to distance memory of counter 4. |
| 42 | Halt sequence over line 73 and display true distance on display 7 by command to respond to signals from counter 4 which are on bidirectional bus 3. If Time information is available pass to next location. |
| 48 | Read True Distance from memory of distance counter 4 into processor 1 over bidirectional bus 3 and unidirectional bus 2. |
| 51 | Multiply by preset constant from Data Prom 12 (3600 for m.p.h.) |
| 56 | Divide by time information from time counter 5 (command C from Source Prom 10). |
| 62 | Halt and display speed on display 7 over timing bus 9. If TIME RESET push switch 19 is actuated return to location 42. |
| 68 | Error programmes to display 000.1. |
| 85 | |
| 86 | Spare programme space. |
| 255 | |

Programme Jumps

As indicated above, bit 3 of CONTROL PROM 13 is used to define exit points for jump instructions in the programme. There are basically two methods of initiating jump instructions, a hardware method and a software method. In the hardware method four points in the circuit are continuously monitored for error conditions. These are Distance Repeated operation, Time Repeated operation, and Excess Time or Excess Distance operation. One or more of the error conditions will initiate a Multiple Operation Error Flag (MOEF) signal. The MOEF signal is interrogated by bit 3 of PROM 12 at predetermined points in the programme and if a "true" signal is found then a programme jump is initiated.

The software method of initiating jump instructions is defined within the programme. It may be convenient to use the processor to perform a number of check calculations on the available data and produce a defined error output if these calculations are incorrect. For example the programme is advantageously, as described above, arranged to check minimum or maximum true distance against predetermined values. The jump output from the processor is again interrogated by bit 3 of PROM 12 at predetermined points in the programme, and whenever the output is true a programme jump is initiated.

Both the hardware and software jump procedures initiate a programme jump to one of the two error programmes (i.e. display 000.1).

Time and Distance Switch Input Circuits

Figure 2:
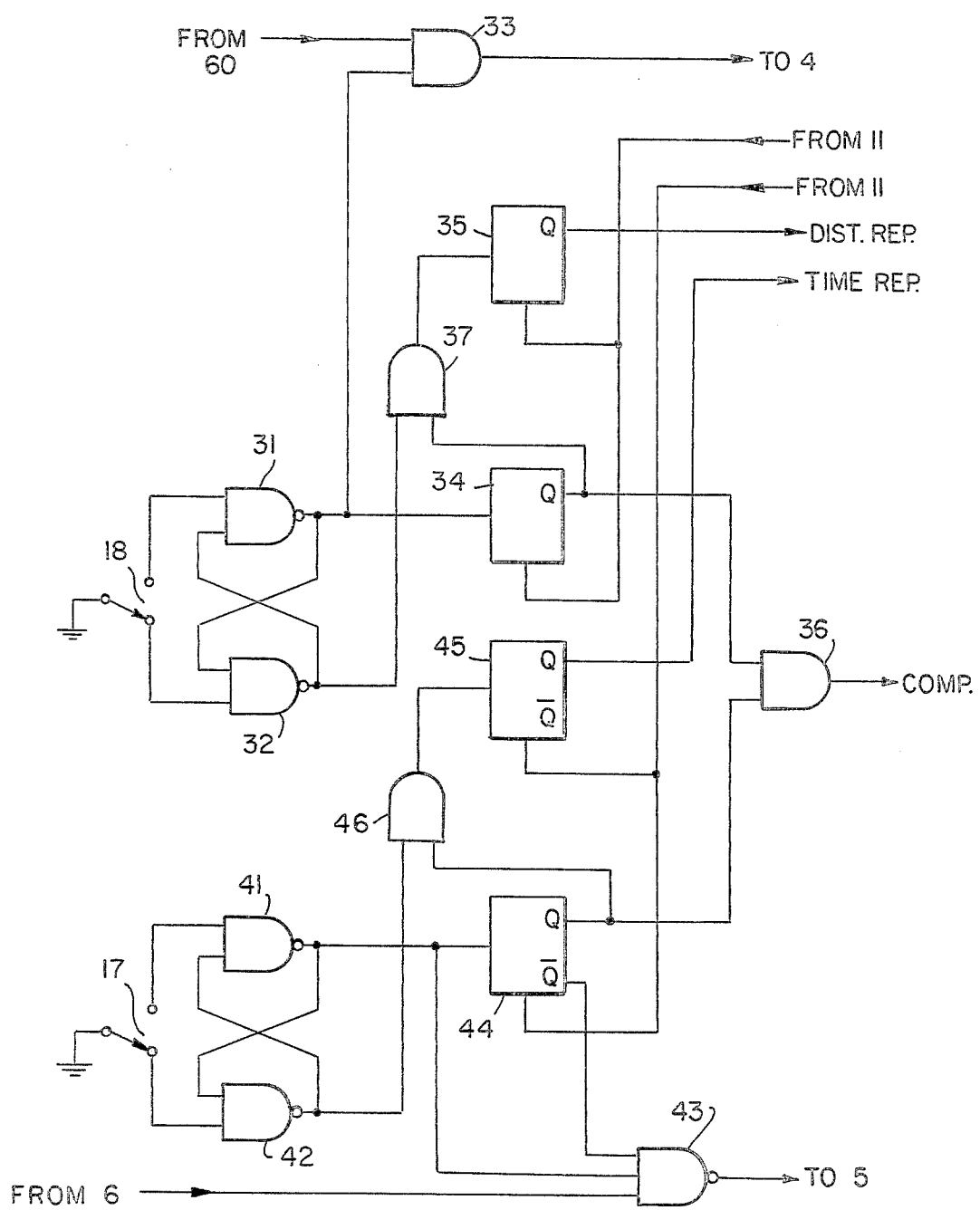
FIG. 2 is a diagram of a part of a logic system used in the apparatus of FIG. 1.

A circuit diagram of the time and distance switch input circuits included in Control Logic 16 is shown in FIG. 2. When the distance switch 18 is closed, a distance bistable circuit comprising gates 31 and 32 is set and "AND" gate 33 is enabled. As indicated in FIG. 1, the distance pulses from the odometer generator 60 are applied to AND gate 33. When gate 33 is enabled, the odometer pulses are passed on to the distance counter 4, by way of a gate 81 enabled by a control signal from Destination PROM 11, as shown in FIG. 1. The output of the bistable 31, 32 is also applied to two flip-flops 34 35. The Q output of flip-flop 34 appears when the distance bistable circuit 31, 32 is reset (i.e. at the end of a distance measurement). The flip-flop output is applied to an AND gate 36 which, as will later be fully understood, changes state only when both a distance and a time measurement have been made and provides a "ready to compute" signal over lead 15 to the sequence control logic 14. Through the intermediary of an AND gate 37, flip-flop 35 changes state if more than one operation of the DISTANCE switch 18 is effected.

If flip-flop 35 is set, its Q output provides a Distance Repeated signal which, as already mentioned, will give rise to an error-denotive display.

When the TIME switch 17 is actuated a time bistable circuit 41, 42 is set and a NAND gate 43 is enabled. As is also indicated in FIG. 1, timing pulses from clock 6 are applied to gate 43 and thus, when this gate is enabled, to time counter 5. The set output of bistable circuit 41, 42 is applied also to flip-flops 44 and 45. Flip-flop 44 provides a signal at its Q output when the time bistable circuit 41, 42 is reset (i.e. at the end of a timing period). This output is applied to gate 36 to produce the "ready to compute" signal already mentioned. By way of a gate 46 it is arranged that flip-flop 45 provides an error-denotive Q output if more than one operation of TIME switch 17 is performed before a reset signal is received. As already stated, this Time Repeated error signal causes a fault-denotive display to be provided.

In certain circumstances it may be desired to indicate to the operator when the distance travelled has exceeded a predetermined minimum amount (for example 0.1 mile). This may readily be arranged by providing a suitable indicating means, conveniently an LED 50 on the operating panel, which is arranged through the intermediary of a gating means 51 to produce a visual indication when a predetermined state of count, representing the required minimum distance, has been attained in distance counter 4. For an odometer providing pulses at a rate of 6000 per mile it may be arranged that the panel display is present until a count of 600 (=1/10 mile) has been reached, and is then extinguished.

Calibration of the apparatus requires that the vehicle shall be driven over an accurately known, measured distance; the longer the better, in order to improve calibration accuracy. The chosen distance is conveniently 0.5 or 1 mile (or kilometer, as may be the case). The calibration switches 8 are first set to a number representing the known distance, thus, for example:

| Distance (miles or km) | Switch Setting |
|---|---|
| 1 | 1000 |
| 0.5 | 0500 |
| 0.25 | 0250 | or otherwise, as will be obvious. The vehicle is then driven over the known distance, the DISTANCE switch being turned ON at the beginning and OFF at the end of the measured distance. Steps 0–42 of the programme sequence given above will be performed. If, for example, the calibration distance is one mile (switch setting 1000) and the odometer pulse generator has provided 5872 pulses over the calibration distance, programme steps 0-42 will calculate 5872 divided by 1000 and will display the result (5.872) on the display. This number is then set on the calibration switches and any distance traversed will automatically be correctly computed from the generated odometer pulses.

Figure 3:
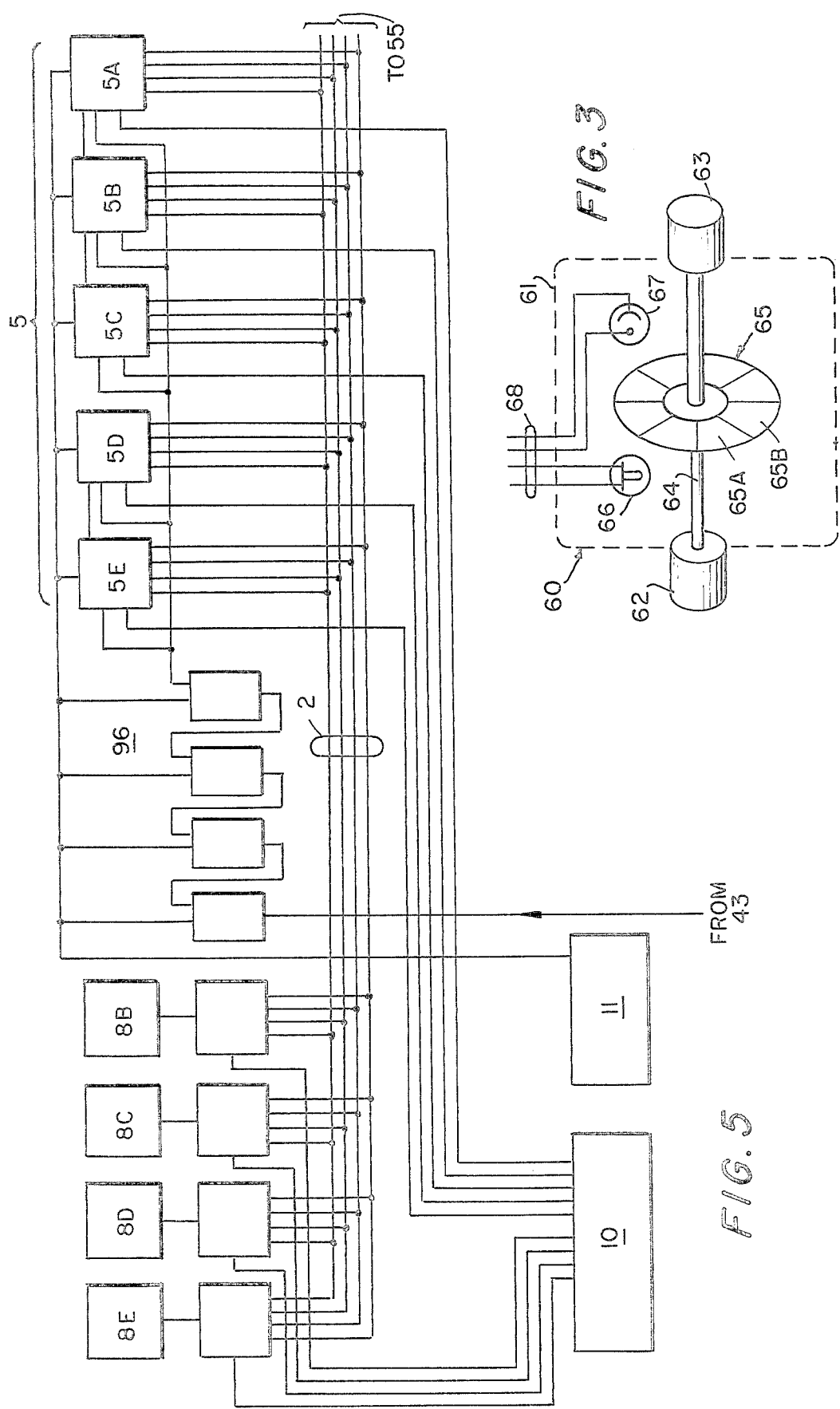
FIG. 3 is a schematic representation of a form of odometer pulse generator suitable for use with the apparatus of FIGS. 1 and 2.

FIG. 3 schematically represents a form of pulse generator 60 suitable to be driven by the vehicle odometer to provide the distance-representative pulse signals. The pulse generator comprises a casing 61 of arbitrary form and therefore shown only in broken line, having at opposed and aligned positions means 62, 63 arranged for coupling respectively to the vehicle gearbox odometer ferrule and to the casing of the vehicle odometer drive cable. Between coupling means 62, 63 extends a shaft 64 arranged to couple the gearbox odometer drive output shaft to the flexible inner shaft of the odometer drive cable. On shaft 64 is arranged a disc 65 having peripheral portions 65A, 65B of alternately different transparencies, that control the transmission of light from a source 66 to an electrically photo-responsive device 67. Light source 66 and device 67 are connected with the apparatus described by leads 68.

Operation of Distance Counter

Figure 4:
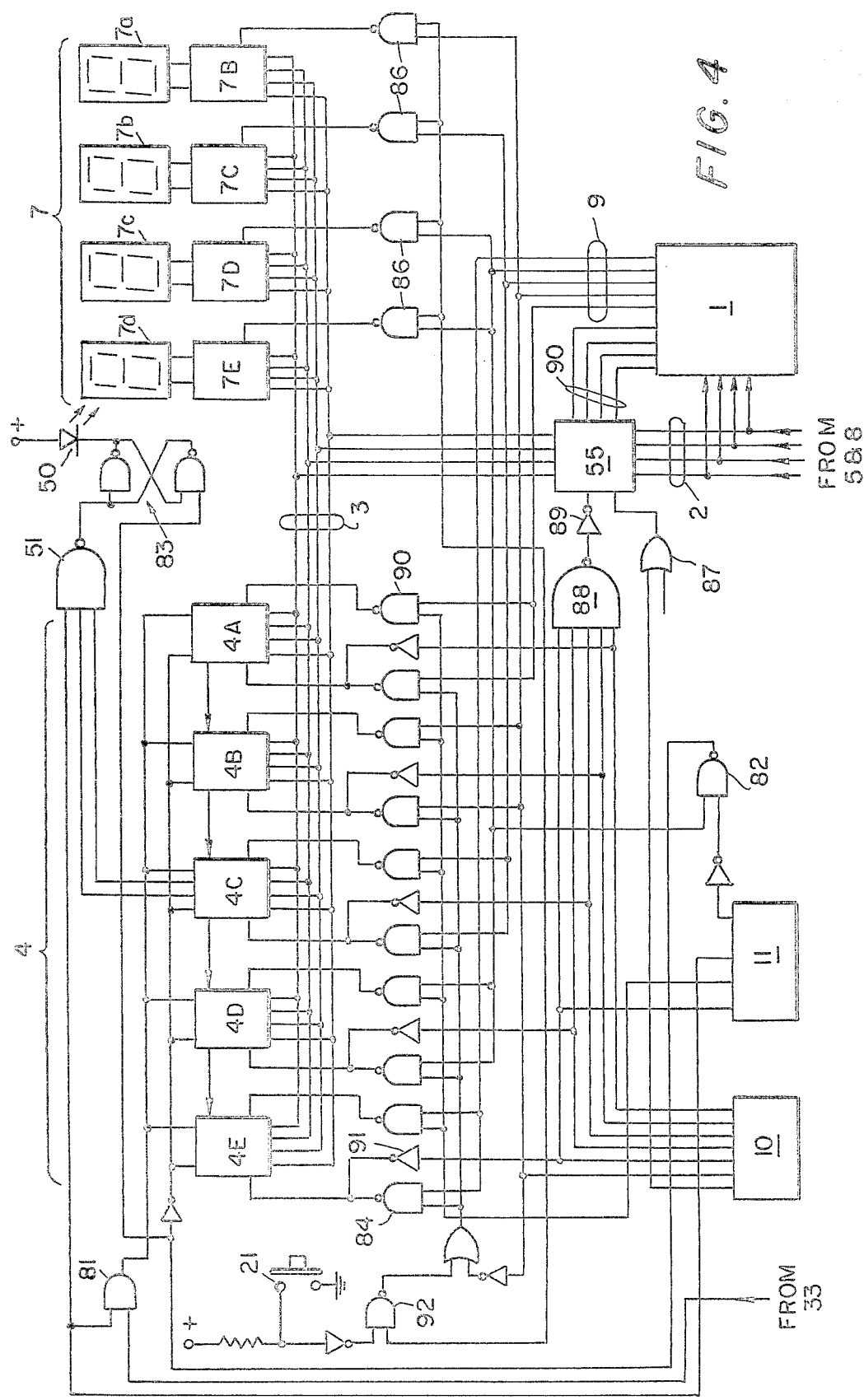
FIG. 4 is a diagram explanatory of the logic operations associated with the distance counter.

The manner of operation of distance counter 4 will be described with reference to FIG. 4. Counter 4 comprises five counter circuits 4A-4E fed with the distance-representative pulses from odometer pulse generator 60 by way of gate 33 of FIG. 2 and an AND gate 81 enabled by a signal from Destination PROM 11. The signals from gate 81 are applied to each of stages 4A-4E which are connected by carry links.

Stages 4A-4E are initially set to zero by a signal received from PROM 11 by way of a NAND gate 82 enabled by a signal on a processor output line that also enables the input and output gates for stage 4D, as later discussed. The NAND gate output signal is inverted before being applied to stages 4A-4E but is applied directly to reset a bistable circuit 83 controlling a light emissive diode 50. Bistable circuit 83 is set by the output of a gate 51 receiving an enabling input from PROM 11 and two inputs from stage 4C of counter 4 so that diode 50 is lit until a count of 600 is reached.

Counter stages 4A-4E all have input/output connections for receiving or providing binary-coded decimal signals. These connections are taken by way of the bidirectional bus 3 to the four decoder stages 7B-7E of display 7, each of which controls a respective 7-segment display device 7a-7d.

All stages of the counter 4 and display 7 are controlled in an identical manner and the operation of one stage of each, specifically stages 4A and 7B, is therefore described in detail.

When a number has been counted into counter 4 by way of gate 81 as already described, this number may be transferred into processor 1 over bidirectional bus 3. For this purpose a NAND gate 84, enabled by an Output Enable signal from PROM 11 is actuated by the respective one of a sequence of read-out signals provided by processor 1 over lines 9 and which are also applied to gates 86 controlling the decoders 7B-7E, so that these accept the respective signals from counter stages 4A-4E and display the appropriate numbers. The signals on bidirectional bus 3 are fed to the unidirectional bus 2 by way of selector 55, which is appropriately controlled by a signal from PROM 10 fed to it by way of an OR gate 87.

When processor 1 has divided the number of distance pulses initially stored in counter 4 by the calibration factor received over unidirectional bus 2 from calibration switches 8, as later described, the number representing true distance is fed into counter 4. To this end selector 55 is set to pass signals from processor output lines 90 to bidirectional bus 3 and gates 90 of stages 4A-4E are enabled by a signal from PROM 11 and individually actuated, to set the respective counter stages 4A-4E to accept signals from bus 3 by successive signals from the processor 1 over processor timing lines 9.

The true distance is then displayed on display 7, into the decoders 7B-7E of which it has been introduced while being fed into counter 4.

When timing information has become available as described below, the next step is to feed the true distance from counter 4 back to processor 1 for use in determining the speed. This is effected by signals applied from PROM 10 to counter stages 4A-4E in succession, by way of inverters 91, the presence of any one of these signals applying a signal, by way of NAND gate 88 and inverter 89 to cause signals from bidirectional bus 3 to pass to bus 2 and thence into processor 1.

When Distance Recall switch is actuated, a NAND gate 92 passes an enabling signal to gates 84 of counter 4 and to gates 86 of display 7.

Operation of Calibration Switches

As shown in FIG. 5, each of the manually settable calibration switches 8B-8E is arranged to apply binary-coded signals representative of the number to which it is set to a respective logic unit 95. When the calibration factor is required in processor 1, logic units 95 are interrogated in turn by signals from PROM 10 to feed the appropriate binary signals into unidirectional bus 2 and thence into the processor.

Operation of Timing Counter

As shown in FIG. 2, when Timing Switch 17 is actuated, gate 43 is enabled to pass signals from clock 6 to the timing counter. As shown in FIG. 5, the signals from gate 43 are fed through a divider 96, comprising two divide-by-sixteen and one divide-by-ten stages sequence, to the counter 5, comprising five counter stages, each yielding a respective BCD output to unidirectional bus 2 when interrogated by a signal from PROM 11 as the time information is required by the processor.

What we claim is:

1. In a vehicle speed measuring apparatus arranged to be mounted on a carrying vehicle and including means for generating a first train of pulses of which the number is proportional to distance travelled by the carrying vehicle, a distance counter, first manually operable control means for connecting said first train of pulses to said distance counter to cause said counter to be driven by said first pulse train and to provide distance signals representative of the state of count of said distance counter, means for generating a second train of pulses of which the number is proportional to a lapsed time, a time counter, second manually operable control means for connecting said second train of pulses to said time counter to cause said time counter to be driven by said second pulse train and to provide time signals representative of the state of count of said time counter, arithmetic processing means for dividing one input by a second input having an output representative of the quotient, display means for providing visual display of an input signal representative of a number, selectively actuable interconnections interconnecting the count in said distance counter as an input to said arithmetic processing means, interconnecting the count in said time counter means as an input to said arithmetic processing means and interconnecting the quotient signal output of said arithmetic processing means as an input to said display means, and control means for said arithmetic processing means and interconnections whereby when said first and second manually operable means have been actuated said arithmetic processing means divides the count in said distance counter by the count in said time counter and displays the result on said display means, the improvement in which there is further provided a manually settable switch means arranged to provide a signal representive of a multi-digit number, a selectively actuable connection between said switch means and said arithmetic processing means as an input to said arithmetic processing means, and said control means is further operable to connect said processor to said switchable means and distance counter to cause said processor to divide the count in said distance counter by the number represented by said switchable means and to display the quotient and to cause said quotient to be introduced into said distance counter.

2. Apparatus in accordance with claim 1, wherein said control means includes a sequence control means arranged to cause control signals for actuating said interconnections to be provided in succession from respective addresses in a plurality of programmable read-only memories (PROM'S), a Source PROM providing control signals to select a source from which signals are to be transferred, a Destination PROM providing control signals to select a destination to which signals are to be transferred, a Data PROM providing data signals representative of preset numbers required by said processor, and a Control PROM providing control signals commanding the processor to perform specific operations.

3. Apparatus in accordance with claim 2, and including a Distance switch operable to cause pulses of said first pulse train to pass from an odometer pulse generator to said distance counter by way of a first gate enabled by signals from a bistable circuit operated by said Distance switch and by way of a further gate enabled by a signal from said Source PROM.

4. Apparatus in accordance with claim 3, and further including an additional flip-flop controlled by said Distance switch so as to yield an error output in the event of repeated successive operation of the Distance switch without an intervening operation of the Distance reset switch, said error output being arranged to yield an error-denotive display.

5. Apparatus in accordance with claim 2, and including a Distance Recall switch operable to cause the distance stored in the distance counter to be displayed on the display means.

6. Apparatus in accordance with claim 2 and including a Time switch operable to cause pulses of said second pulse train to pass from a constant-frequency clock generator to said time counter by way of a gate enabled by signals from a bistable circuit actuated by said Time switch and from a flip-flop responsive to the output of said bistable circuit.

7. Apparatus in accordance with claim 6, and further including a Time Reset switch operable to return the time counter to its initial condition.

8. Apparatus in accordance with claim 6, and further including an additional flip-flop controlled by said Time switch so as to yield an error output in the event of repeated successive operation of said Time switch without an intervening operation of the Time Reset switch, said error output being arranged to yield an error-denotive display.

9. Apparatus in accordance with claim 1, and including selectively operable means arranged to provide a signal to an operator of the apparatus when said distance counter exceeds a predetermined minimum state of count.

10. Apparatus in accordance with claim 1, and including a Distance Reset switch operable to cause all elements of the apparatus to return to a predetermined initial condition.

* * * * *